(12) United States Patent
Doh et al.

(10) Patent No.: US 6,909,082 B2
(45) Date of Patent: Jun. 21, 2005

(54) AUTOMATIC THRESHOLD CONTROL DEVICE FOR BURST MODE OPTICAL RECEIVER

(75) Inventors: Hee-Chan Doh, Suwon (KR); Hyeon-Cheol Ki, Seoul (KR); Yun-Je Oh, Yongin (KR); Gil-Yong Park, Suwon (KR); Tae-Sung Park, Suwon (KR); Shin-Hee Won, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 10/396,198

(22) Filed: Mar. 25, 2003

(65) Prior Publication Data

US 2003/0202802 A1 Oct. 30, 2003

(30) Foreign Application Priority Data

Apr. 25, 2002 (KR) ................. 10-2002-0022714

(51) Int. Cl.⁷ ................................ H01J 40/14
(52) U.S. Cl. ................ 250/214 AG; 250/214 A; 330/308
(58) Field of Search ............ 250/214 A, 214 AG, 250/221, 222.1; 330/69, 110, 308; 375/318

(56) References Cited

U.S. PATENT DOCUMENTS 5,822,104 A * 10/1998 Saito ................. 398/202
5,923,219 A 7/1999 Ide et al. ............. 330/308
6,587,004 B2 * 7/2003 Ide ..................... 330/308
2002/0063937 A1 * 5/2002 Kikuchi ............... 359/189

FOREIGN PATENT DOCUMENTS

| EP | 0729243 A2 | 8/1996 | ......... H04B/10/158 |
| EP | 0903751 A2 | 3/1999 | ........... G11C/27/02 |
| EP | 1006653 A2 | 6/2000 | ............ H03K/5/08 |

* cited by examiner

Primary Examiner—Stephone B. Allen
Assistant Examiner—Patrick J. Lee
(74) Attorney, Agent, or Firm—Cha & Reiter, L.L.C.

(57) ABSTRACT

An automatic threshold control device for a burst mode optical receiver is disclosed. The receiver includes a converter that converts a burst mode signal into a voltage signal and an automatic gain controller for automatically controlling a gain of the converter, independently generating a reset signal and applying it to the automatic threshold control device. The automatic threshold control device is adapted to detect a voltage level of an output signal from the converter. The device includes a peak detector that detects a peak level of the output signal from the converter in response to the reset signal, a bottom level detector that detects a bottom level of the output signal from the converter in response to the reset signal, a pair of resistors having their one sides connected respectively to the peak detector and bottom level detector and their other sides connected to each other, the resistors generating a reference voltage on the basis of voltages of the peak level and bottom level, and a capacitor for storing the reference voltage.

9 Claims, 17 Drawing Sheets

AUTOMATIC THRESHOLD CONTROL DEVICE FOR BURST MODE OPTICAL RECEIVER

CLAIM OF PRIORITY

This application claims priority to an application entitled "AUTOMATIC THRESHOLD CONTROL DEVICE FOR BURST MODE OPTICAL RECEIVER," filed in the Korean Industrial Property Office on Apr. 25, 2002 and assigned Serial No. 2002-22714, the contents of which are hereby incorporated by reference.

BACKGROUND OF THE INVENTION

1. Field of the Invention

The present invention relates to burst mode optical receivers, and more particularly to an automatic threshold control device for a burst mode optical receiver that is capable of determining whether an input signal is present and independently generating a reset signal for initialization in an inter-packet period in accordance with the determination.

2. Description of the Related Art

In order to more rapidly transfer a large amount of information to subscribers, next-generation communication techniques require an FTTH (fiber to the home) system. In such conventional FTTH systems, an optical line is installed to each home. However, a significant shortcoming of the conventional FTTH systems is that it is very costly to replacing existing subscriber networks composed of copper wires. In view of this cost, a passive optical network (PON) is considered an alternative for implementing a cost-effective the FTTH system.

FIG. 1 shows a diagram of a passive optical network. The passive optical network includes an OLT (Optical Line Termination), which may be located in a central office, a 1×N-passive optical splitter, and ONUs (Optical Network Units), located in a subscriber's premises.

Generally, in an optical multi-connection network, such as the passive optical network as shown in FIG. 1, each node transfers a packet or data to a different node using a predetermined time slot. Such optical multi-connection networks are different from existing point-to-point links in that received data or packets are different in amplitude and phase from one another due to optical losses occurring on different transfer paths. The data is typically called burst mode data. In other words, a plurality of subscribers utilize one optical line in a time division multiplex manner, but a receiver, i.e., the OLT, on the line recognizes that each subscriber sends data at a random time. The incoming data packets are not constant in amplitude due to differences among paths to respective subscribers.

A conventional burst mode optical receiver is known that receives burst mode data which is different in amplitude and phase on a packet basis and restores the received burst mode data such that their packets are the same in amplitude and phase. Such burst mode optical receiver removes a DC blocking capacitor used in an AC coupling scheme of a general receiver to prevent losses of burst mode data resulting from charging/discharging times of the capacitor. The burst mode optical receiver also functions to extract a detection threshold as a reference signal for data detection from each received burst mode packet. The burst mode optical receiver further functions to restore data by amplifying it symmetrically with respect to the extracted detection threshold.

FIG. 2 schematically shows the construction of a conventional burst mode optical receiver. The conventional burst mode optical receiver includes an optical detector 10, a preamplifier or transimpedance amplifier (TIA) 1, an automatic threshold controller (ATC) 2 and a limiting amplifier 3.

The optical detector 10 acts to convert an input optical signal into a current signal.

The TIA 1 functions to convert the current signal converted by the optical detector 10 into a voltage signal. A transimpedance, which is an input current-to-output voltage ratio, is determined by a feedback resistor Rf connected between an input terminal of the TIA 1 and an output terminal thereof.

In the burst mode optical receiver, the TIA 1 is used in a DC coupling manner. An input signal is amplified by the TIA 1 and then branches off into two parts. One part is input to the ATC 2, which then extracts a detection threshold of a received packet therefrom. The other part is DC-coupled and input to the limiting amplifier 3. The detection threshold, which is automatically changed according to the amplitude of the corresponding packet, is input to Vref of the limiting amplifier 3. The limiting amplifier 3 functions to amplify signals of different amplitudes input thereto to restore them to signals having a constant amplitude.

However, the above-mentioned conventional burst mode optical receiver has a disadvantage in that a reset signal for initialization in an inter-packet period is inputted through the use of an external additional circuit. This makes it difficult to accurately control a reset timing. In addition, the use of the external additional circuit makes the receiver circuitry complicated and increases the size of the receiver parts.

Accordingly, there is a need in the art for an improved burst mode optical receiver.

SUMMARY OF THE INVENTION

One object of the present invention to provide an automatic threshold control device for a burst mode optical receiver that is capable of determining whether an input signal is present and independently generating an initial reset signal in accordance with the determination.

Another object of the present invention is to provide an automatic threshold control device for a giga-class burst mode optical receiver that is capable of receiving burst mode data that is different in amplitude and phase on a packet basis and restoring the received burst mode data accurately and rapidly.

One embodiment of the present invention is directed to an automatic threshold control device for a burst mode optical receiver. The receiver includes a converter for converting a burst mode signal into a voltage signal and an automatic gain controller for automatically controlling a gain of the converter and independently generating a reset signal and applying it to the automatic threshold control device. The automatic threshold control device is used to detect a voltage level of an output signal from the converter. The device includes a peak detector for detecting a peak level of the output signal from the converter in response to the reset signal, a bottom level detector for detecting a bottom level of the output signal from the converter in response to the reset signal, a pair of resistors having their one sides connected respectively to the peak detector and bottom level detector and their other sides connected to each other. The resistors are used to generate a reference voltage on the basis of voltages of the peak level and bottom level. The device also includes a capacitor for storing the reference voltage.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
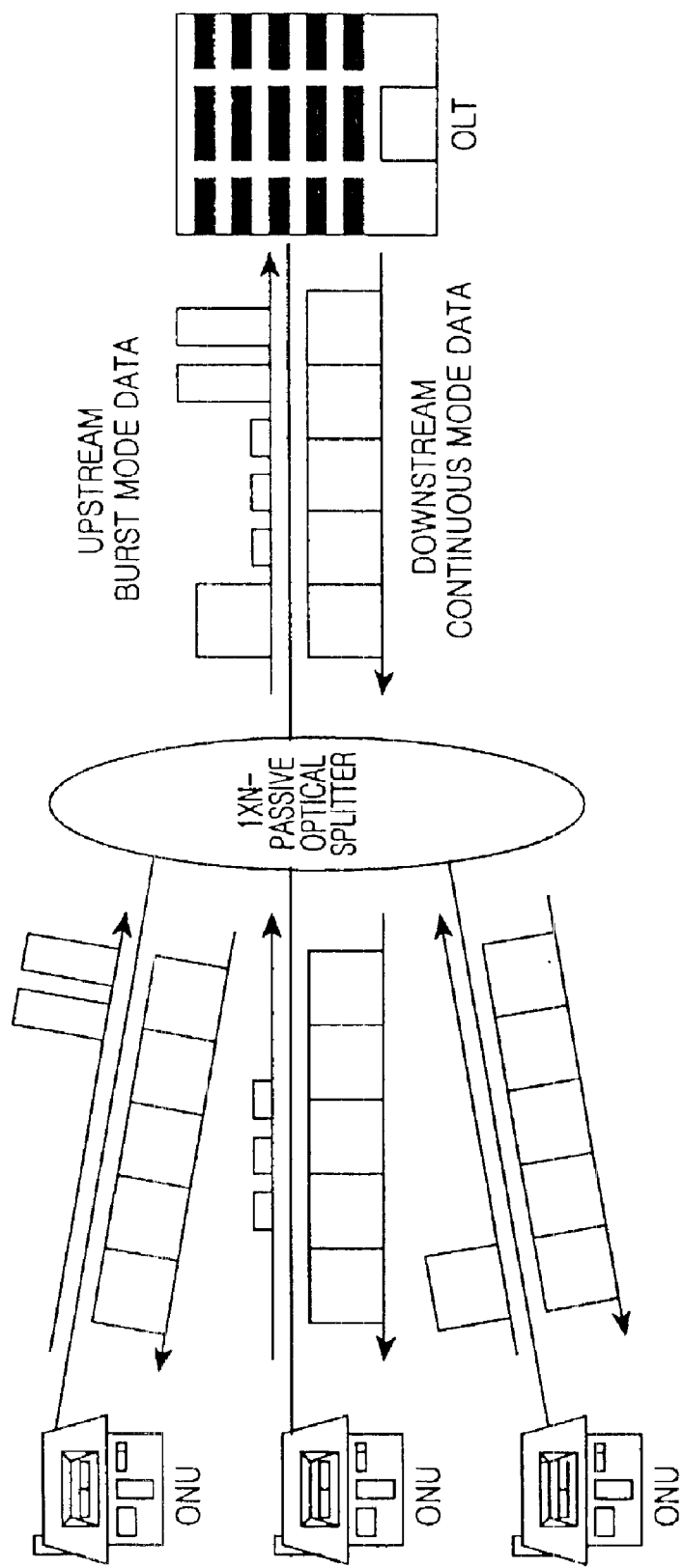
FIG. 1 is a diagram showing the construction of a passive optical network.

Now, preferred embodiments of the present invention will be described in detail with reference to the annexed drawings. In the drawings, the same or similar elements are denoted by the same reference numerals even though they are depicted in different drawings. In the following description of the present invention, a detailed description of known functions and configurations incorporated herein will be omitted when it may obscure the subject matter of the present invention.

Figure 3:
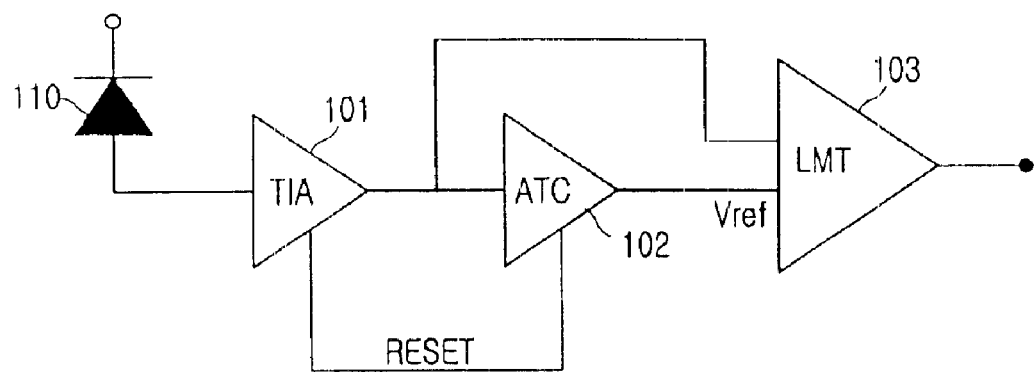
FIG. 3 is a schematic showing the construction of a burst mode optical receiver in accordance with aspects of the present invention.
Figure 4:
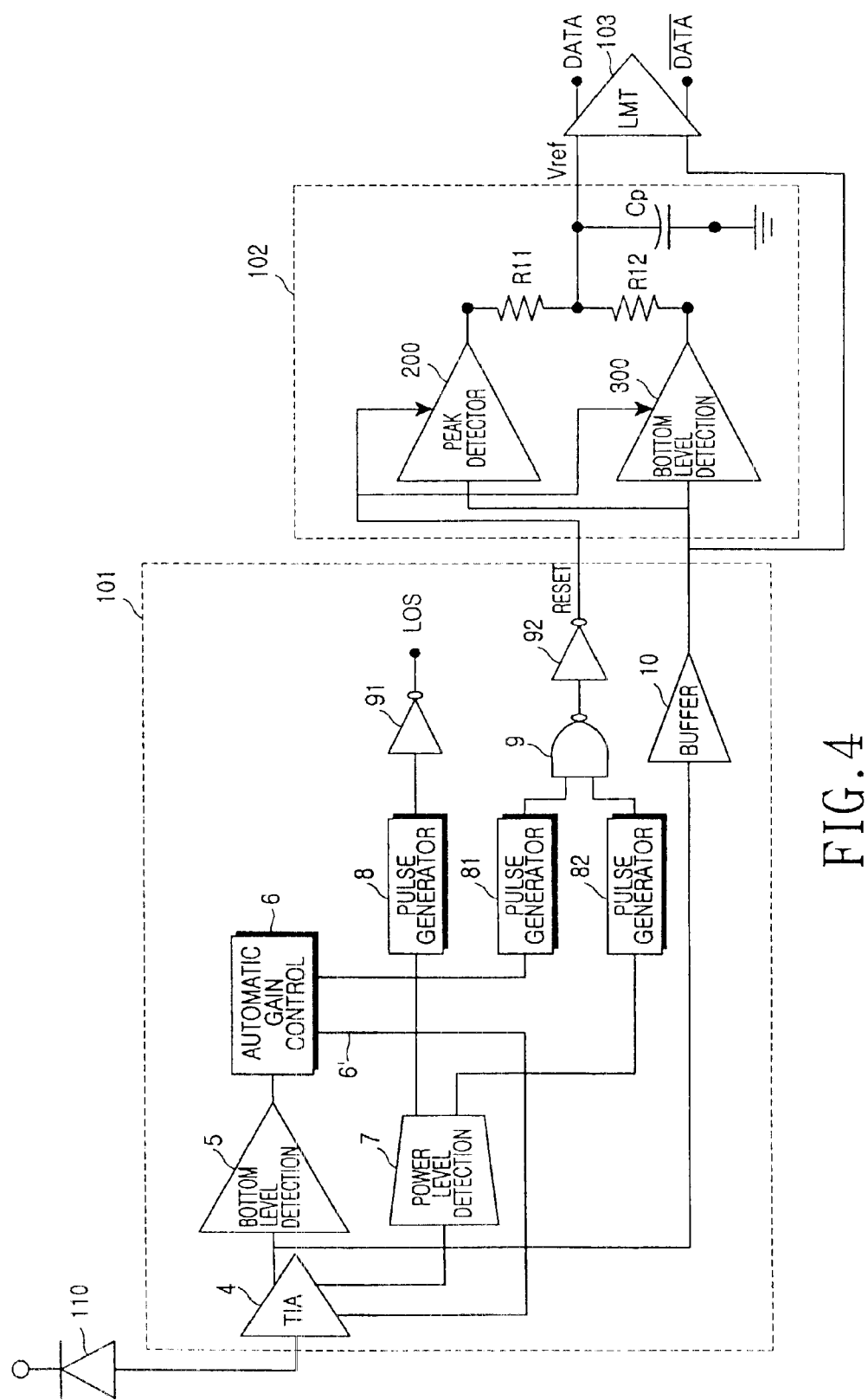
FIG. 4 is a circuit diagram of the burst mode optical receiver in accordance with aspects of the present invention.

FIG. 3 schematically shows the construction of a burst mode optical receiver in accordance with aspects of the present invention. FIG. 4 is a more detailed diagram of the burst mode optical receiver shown in FIG. 3.

Figure 2:
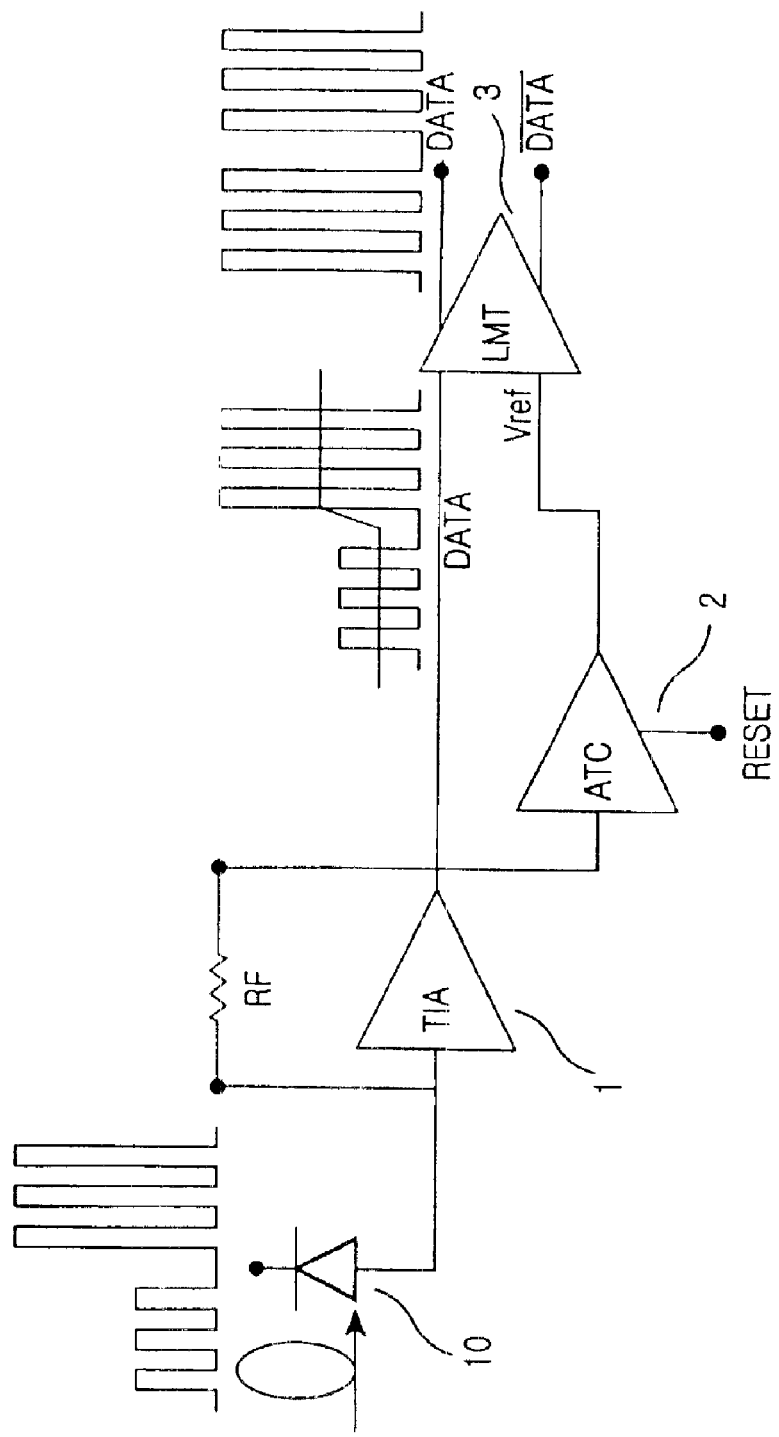
FIG. 2 is a schematic showing the construction of a conventional burst mode optical receiver.

Referring to FIG. 3, the burst mode optical receiver includes an optical detector 110, a preamplifier 101, an ATC 102 and a limiting amplifier 103. It is noted that in one regard, the burst mode optical receiver shown in FIG. 3 is different from the conventional receiver shown of FIG. 2 in that the preamplifier 101 is configured to independently generate a reset signal and apply it to the ATC 102.

Referring now to FIG. 4, the preamplifier 101 includes a TIA 4 that determines the gain and bandwidth of the preamplifier 101, a bottom level detector 5 that detects a bottom level of an output signal from the TIA 4, an automatic gain controller (AGC) 6 that generates an automatic gain control signal on the basis of the bottom level detected by the bottom level detector 5 to automatically control the gain of the TIA 4, a power level detector 7 that detects a power level of the output signal from the TIA 4, a plurality of pulse generators 8, 81 and 82, a NAND gate 9, and an output buffer 10 for the TIA 4.

The TIA 4 converts an output current signal from the optical detector 110 into a voltage signal and provides the converted voltage signal to the bottom level detector 5.

Figure 5:
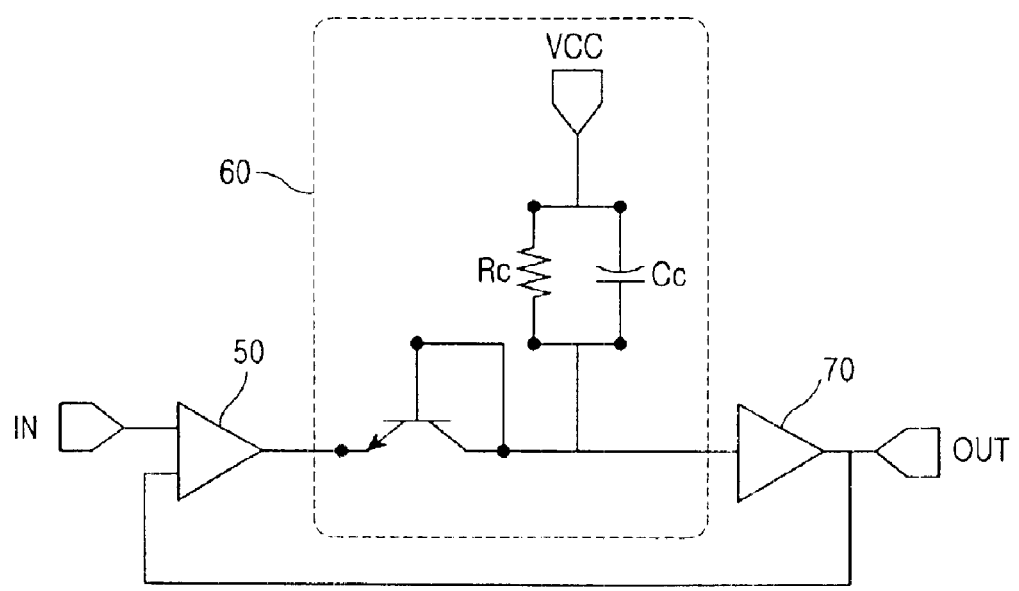
FIG. 5 is a schematic of a bottom level detector in a preamplifier in accordance with aspects of the present invention.
Figure 6:
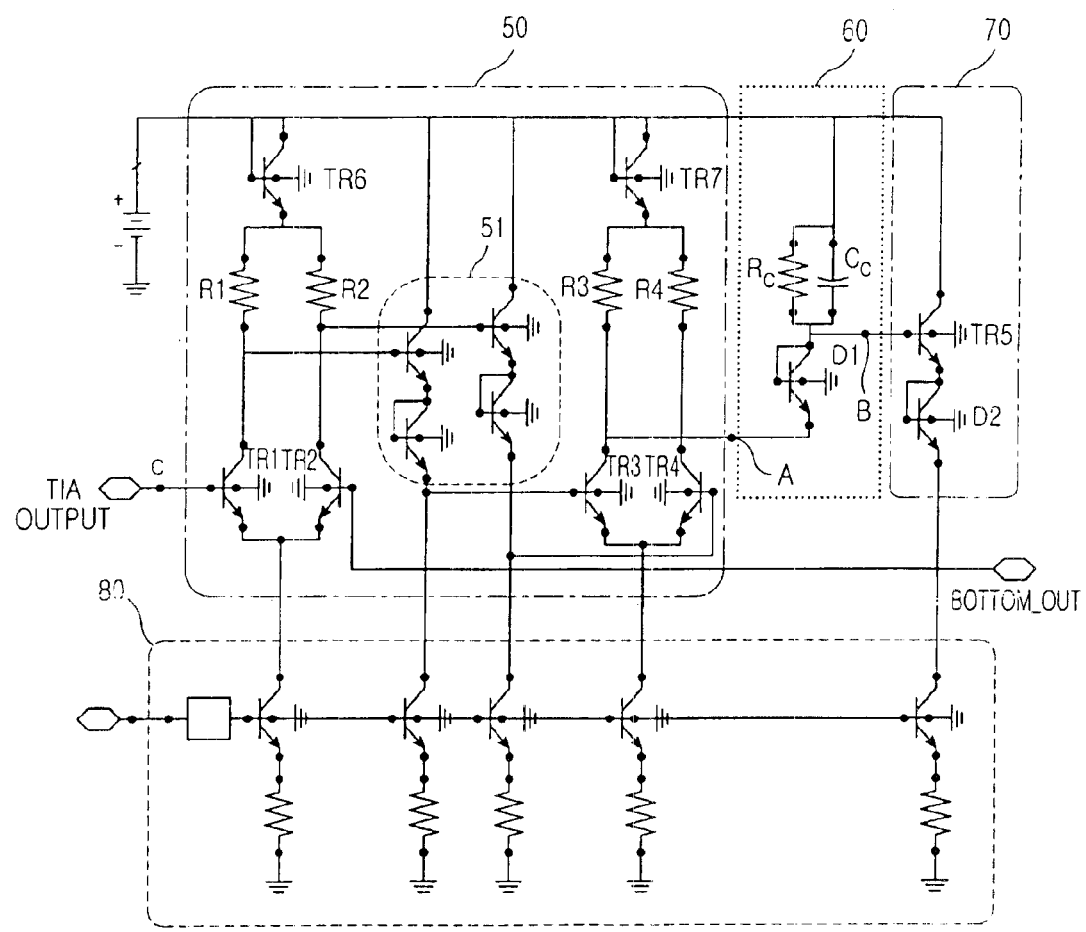
FIG. 6 is a circuit diagram of the bottom level detector in the preamplifier in accordance with an embodiment of the present invention.

FIG. 5 shows the structure of the bottom level detector 5. FIG. 6 is a more detailed circuit diagram of FIG. 5.

Referring to FIG. 5, the bottom level detector 5 includes an amplification circuit 50 that amplifies an input signal, a detector 60 that detects a bottom level of the amplified signal, and an output buffer 70.

Referring now to FIG. 6, the amplification circuit 50 includes a two-stage amplifier having first and second differential amplifiers, and a two-stage buffer 51 connected between the first differential amplifier and the second differential amplifier of the two-stage amplifier. The first differential amplifier is provided with resistors R1 and R2 and transistors TR1 and TR2, and the second differential amplifier is provided with resistors R3 and R4 and transistors TR3 and TR4.

In this embodiment, the reason the two-stage amplifier is used is because when the original signal is directly input to the detector 60 in the bottom level detector 5 and a bottom level thereof is then detected by the detector 60, a voltage offset is generated due to a forward voltage of a diode. This voltage offset, which is about 800 mV, makes it impossible to accurately detect the signal bottom level. In order to overcome this problem, the voltage offset is reduced by the gain of the amplifier by amplifying the signal, detecting the bottom level thereof and feeding it back. For example, if the gain of the amplifier is 40, the voltage offset is 800/40=20 mV. Theoretically, the offset is advantageously reduced by increasing the gain of the amplifier. Nevertheless, a proper control is required because a multi-stage amplifier has a high possibility of circuit oscillation.

The reason two-stage buffer is used is to meet an input voltage condition of the second differential amplifier.

The detector 60, which is provided with a diode D1 and an RC rectifier, receives a signal at a node a, or the signal amplified by the amplification circuit 50. If the voltage level of the signal is lowered negatively, then the diode D1 is forward biased to charge a capacitor C. Alternatively, if the signal voltage level is raised positively, then the diode D1 is reversely biased to enter a cut-off state. This causes the capacitor C to discharge. On this principle, the signal bottom level is maintained. If the capacitor is increased in capacitance, the offset c an be reduced, but there is a disadvantage in that a larger amount of time is required in detecting the bottom level. In the case where the capacitor is reduced in capacitance, the bottom level detection time is advantageously shortened, whereas the offset is increased. For this reason, it is necessary to appropriately adjust an RC time constant.

The buffer 70 is connected to the output of the detector 60 in order to feed a signal detected by the detector 60 back to the amplification circuit 50. The buffer 70 is provided with a transistor TR5 for preventing a reference voltage from varying during consecutive data input and blocking an unnecessary discharging path, and a level shifting diode D2 for adjusting the level of an output voltage.

With the above-described construction and operation, the bottom level detector 5 always detects a bottom level of the output signal from the TIA 4 irrespective of whether the output signal from the TIA 4 is high or low in level. The use of the detected bottom level makes it possible to accurately determine whether an input signal is present. Provided that no signal bottom level is detected, an AGC control signal to be described later will be generated to detect a power level of the input signal. In contrast, while a peak level (top level), detected by a commonly-used peak detector, has no particular problem when an input signal is high in level, but provides no accurate information regarding an actual voltage level when the input signal is low in level, resulting in difficulty in determining whether the input signal is present.

The use of the bottom level detected by the bottom level detector 5 further enables the accurate generation of an AGC signal and the accurate determination of an inter-packet period, so that an output voltage can always be maintained at a proper level.

Figure 9:
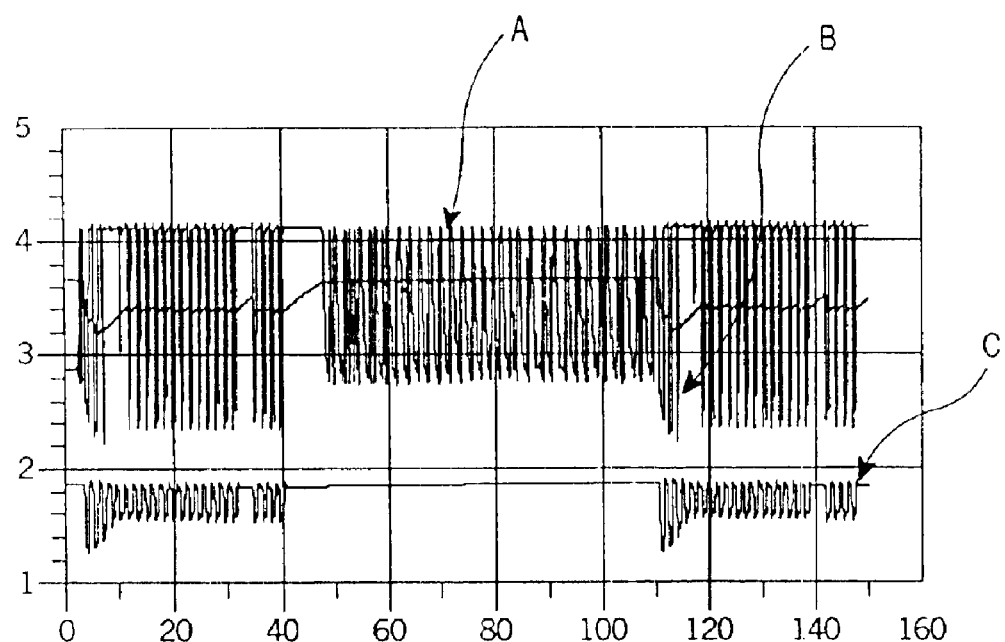
FIG. 9 is a waveform diagram illustrating voltage levels at nodes a, b and c in the bottom level detector in the preamplifier in accordance with aspects of the present invention.

FIG. 9 is a waveform diagram illustrating voltage levels at the nodes a, b and c in FIG. 6, wherein the axis of ordinate represents a voltage level and the axis of abscissa represents time (nsec).

With reference to FIGS. 6 and 9, the reference character A denotes an output characteristic at an output terminal (the node a) of the amplification circuit 50, or an output terminal of the two-stage differential amplifier, B denotes a constant voltage characteristic at an output terminal (the node b) of the detector 60, or an output terminal of the diode and RC rectification filter, and C denotes a voltage level Bottom_In at an output terminal (the node c) of the TIA.

Figure 10:
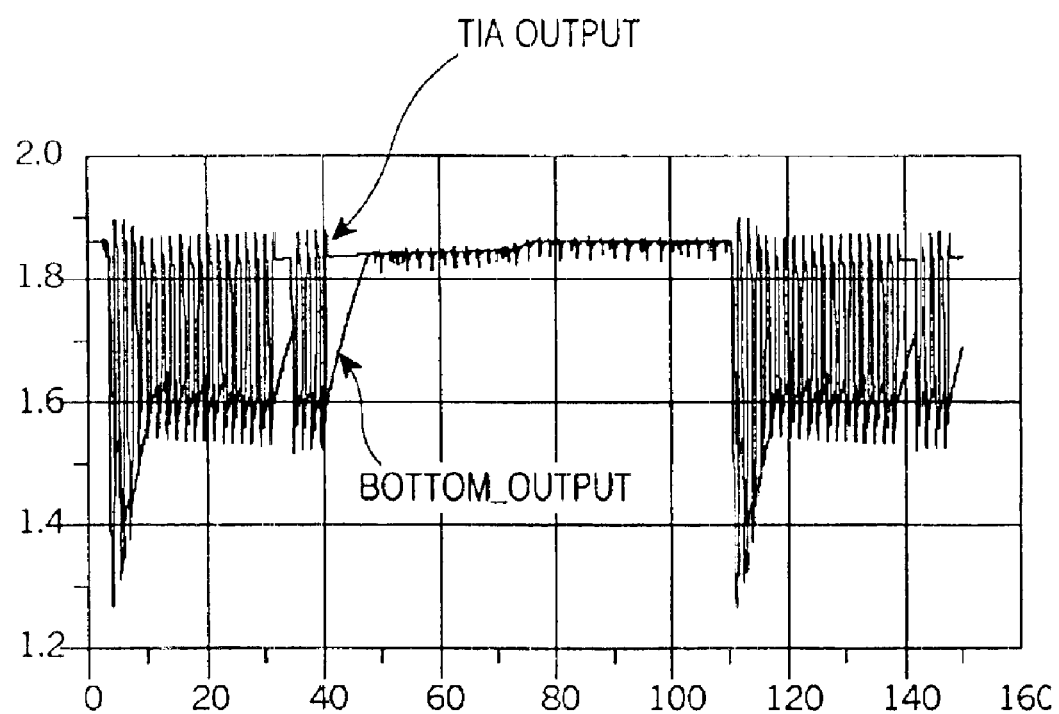
FIG. 10 is a waveform diagram illustrating an input signal-to-output signal characteristic of the bottom level detector in the preamplifier in accordance with aspects of the present invention.

FIG. 10 is a waveform diagram illustrating an input signal-to-output signal characteristic of the bottom level detector in the preamplifier. As noted above, the bottom level of the TIA output signal is detected irrespective of whether the TIA output signal is high or low in level.

Referring again to FIG. 4, the AGC 6 functions to generate an AGC control signal 6' on the basis of the bottom level detected by the bottom level detector 5 to adjust the gain of the TIA 4.

The output current signal from the optical detector 110 generally has current variations within the range of −31 dBm to −16 dBm. Provided that a certain current variation of the output signal from the optical detector 110 is beyond this range, the output signal from the TIA 4 will be subject to considerable distortion. In this regard, the AGC 6 must be operated to compensate for distortion in the output signal from the TIA 4.

To facilitate this, according to aspects of the present invention, the AGC 6 is configured to start its control operation by generating the AGC control signal 6' at the moment that the output signal from the TIA 4 begins to be distorted, namely, the bottom level thereof turns off an output buffering transistor for the TIA 4.

The AGC 6 may preferably include a signal presence determination unit for analyzing the bottom level detected by the bottom level detector 5 to determine whether an input signal is present. Upon determining from the detected bottom level that an input signal is present, the signal presence determination unit generates a signal presence indication signal. However, if no input signal is determined to be present, then the signal presence determination unit generates a signal absence indication signal, which is a packet termination indication signal. This packet termination indication signal resets the AGC signal 6' so that the AGC voltage level can be re-set at the beginning of a next packet.

This prevents the output signal from the TIA 4 from becoming too low in level due to an excessively low operating reference level of the AGC 6. The AGC 6 can also be prevented from being operated after the output signal from the TIA 4 is distorted, due to an excessively high operating reference level of the AGC 6.

The AGC 6 may also include a peak detector for setting and maintaining an initial AGC signal at a collector of an input transistor to a peak level to minimize a jitter resulting from a variation in the actual AGC control signal 6'.

The power level detector 7 detects a power level of the output signal from the TIA 4 to determine whether an input signal is present and whether an inter-packet period is present. The power level detector 7 provides its two output signals, one of which is passed through the pulse generator 8 and an inverter 91 for generation of an LOS signal and the other of which is applied to an input terminal of a reset signal generation circuit.

The power level detector 7 may preferably include a capacitor for coupling the output signal from the TIA 4 to detect the power level thereof regardless of a DC level of an input signal.

The pulse generator 8 generates a pulse signal in response to the first output signal from the power level detector 7 to indicate packet start, packet termination and an interpacket period. The pulse signal generated by the pulse generator 8 is inverted by the inverter 91 and then outputted as the LOS signal. The pulse generator 81 generates a pulse signal in response to the output signal from the AGC 6 and the pulse generator 82 generates a pulse signal in response to the second output signal from the power level detector 7. The pulse signals generated by the pulse generators 81 and 82 are NANDed by the NAND gate 9, inverted by an inverter 92 and then outputted as the reset signal.

The output buffer 10 is adapted to regulate a DC level of the final output signal of the preamplifier 101 in consideration of the input of the final output signal to the ATC 102 and limiting amplifier 103 downstream of the preamplifier 101.

Figure 11A:
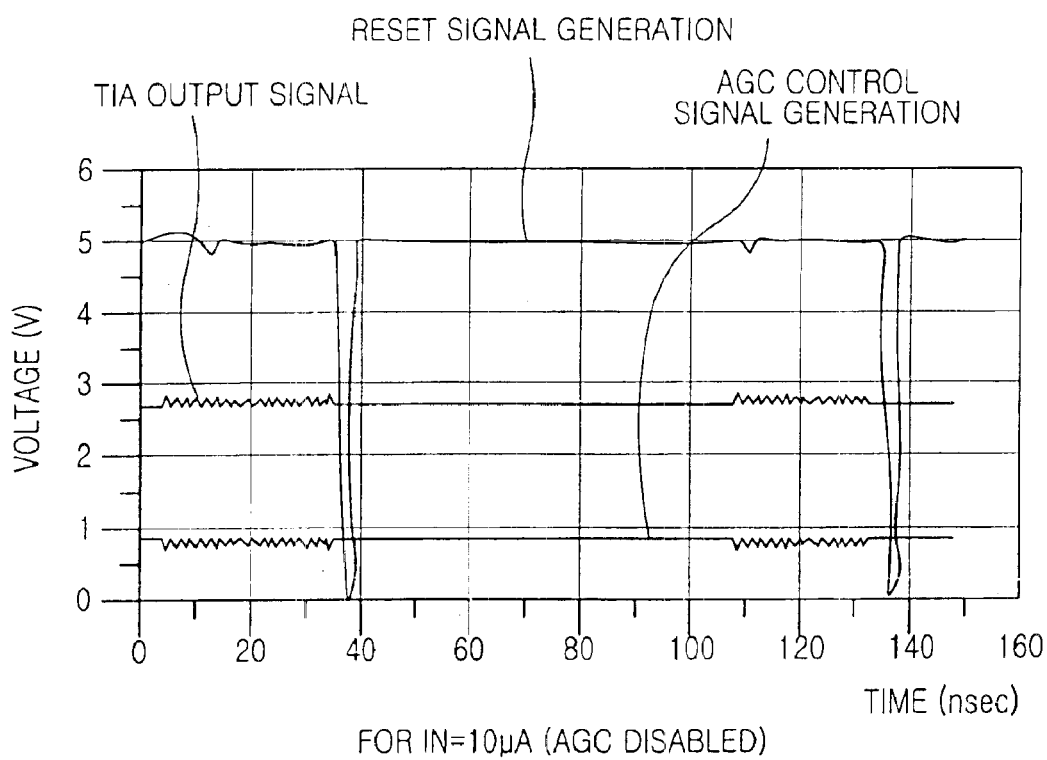
FIGS. 11A and 11B are output waveform diagrams of the burst mode optical receiver according to an embodiment of the present invention, illustrating operation characteristics of the preamplifier based on small input current.
Figure 12A:
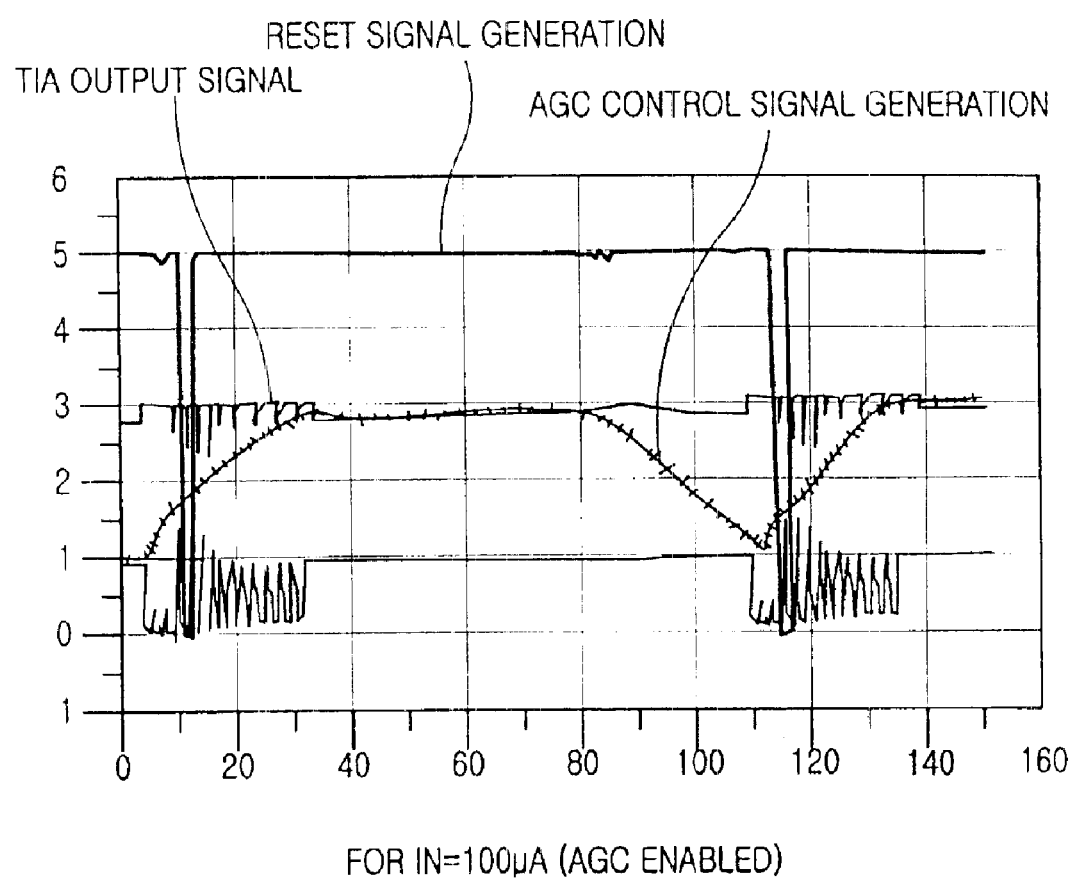
FIGS. 12A and 12B are output waveform diagrams of the burst mode optical receiver according to an embodiment of the present invention, illustrating operation characteristics of the preamplifier based on large input current.

FIGS. 11A and 12A are output waveform diagrams of the burst mode optical receiver according to embodiments of the present invention. These waveforms diagrams illustrate operation characteristics of the preamplifier 101 when an input current is 10 $\mu$A and 100 $\mu$A, respectively. The axis of ordinate represents a voltage level and the axis of abscissa represents time (nsec).

It can be seen from FIG. 11A that the AGC 6 generates no control signal when the input current is small (for example, 10 μA). However, when the input current is of a certain large level (for example, 100 μA), the AGC 6 generates a control signal (see FIG. 12A).

Figure 11B:
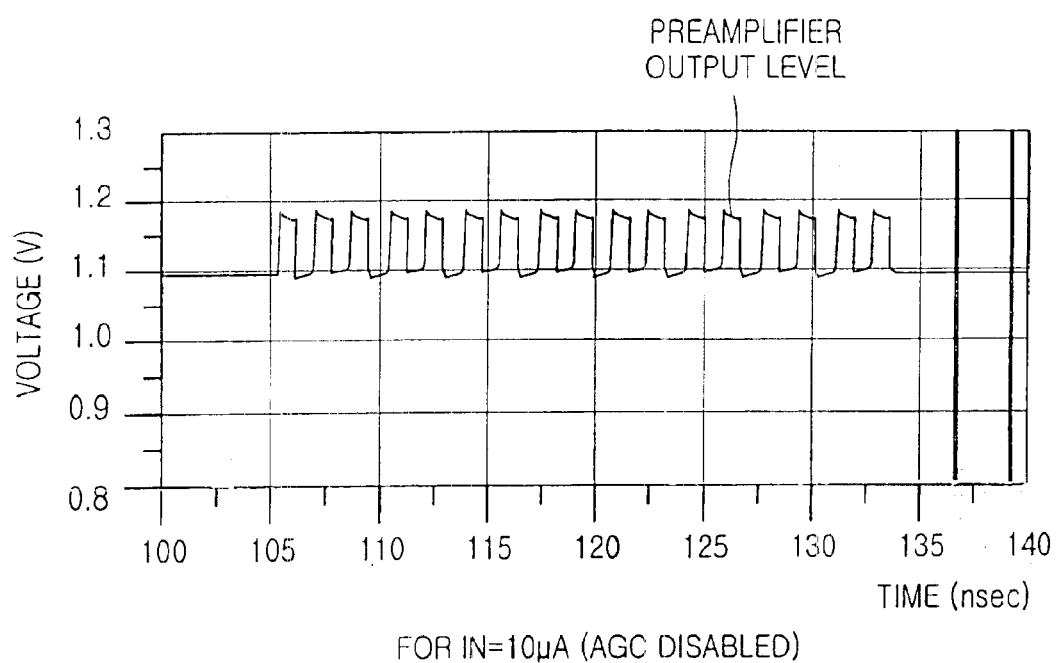
Figure 12B:
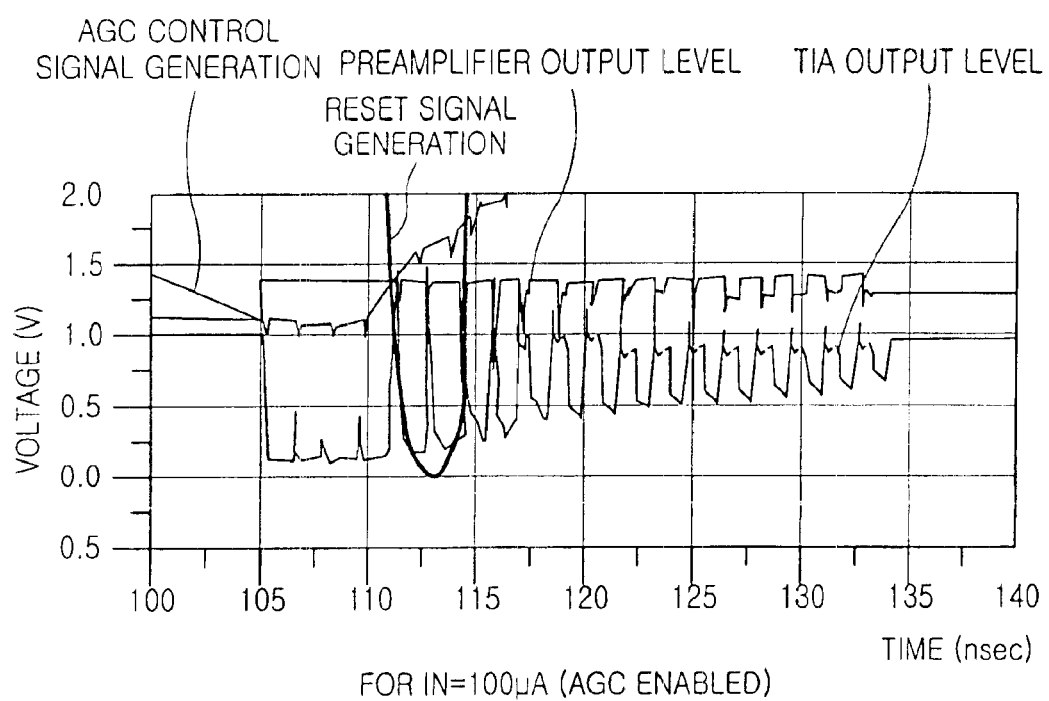

FIGS. 11B and 12B are enlarged views of FIGS. 11A and 12A, respectively. A value of the preamplifier output level −1.6V is shown so that the output level can be depicted in one graph.

The reset signal, independently generated by the preamplifier in the above manner, is applied to the ATC 102 downstream from the preamplifier together with the TIA output signal.

Referring again to FIG. 4, the ATC 102 includes a peak detector 200 that detects a peak level (top level) of an output signal from a converter, preferably including the optical detector 110 and the TIA 4, in response to the reset signal from the preamplifier 101, a bottom level detector 300 that detects a bottom level of the converter output signal in response to the reset signal, a pair of resistors R11 and R12 for performing a voltage dividing operation for output signals from the peak detector 200 and bottom level detector 300 to generate a reference voltage Vref, and a storage capacitor $C_P$ that stores the generated reference voltage. In one embodiment, the resistors R11 and R12 have the same resistances to generate the reference voltage Vref, which is an intermediate voltage of a voltage of the detected peak level and a voltage of the detected bottom level.

The peak detector 200 and bottom level detector 300 detect the peak level and bottom level of the output signal from the converter in response to the reset signal from the preamplifier, respectively. The detected peak level and bottom level are passed through the resistors R11 and R12, so the intermediate voltage thereof is generated.

That is, $Vref=(Vpeak+Vbottom)/2$

The reference voltage, generated as in the above equation, is stored on the capacitor $C_P$ and then sent as information regarding an inter-packet period to the subsequent stage.

Figure 7:
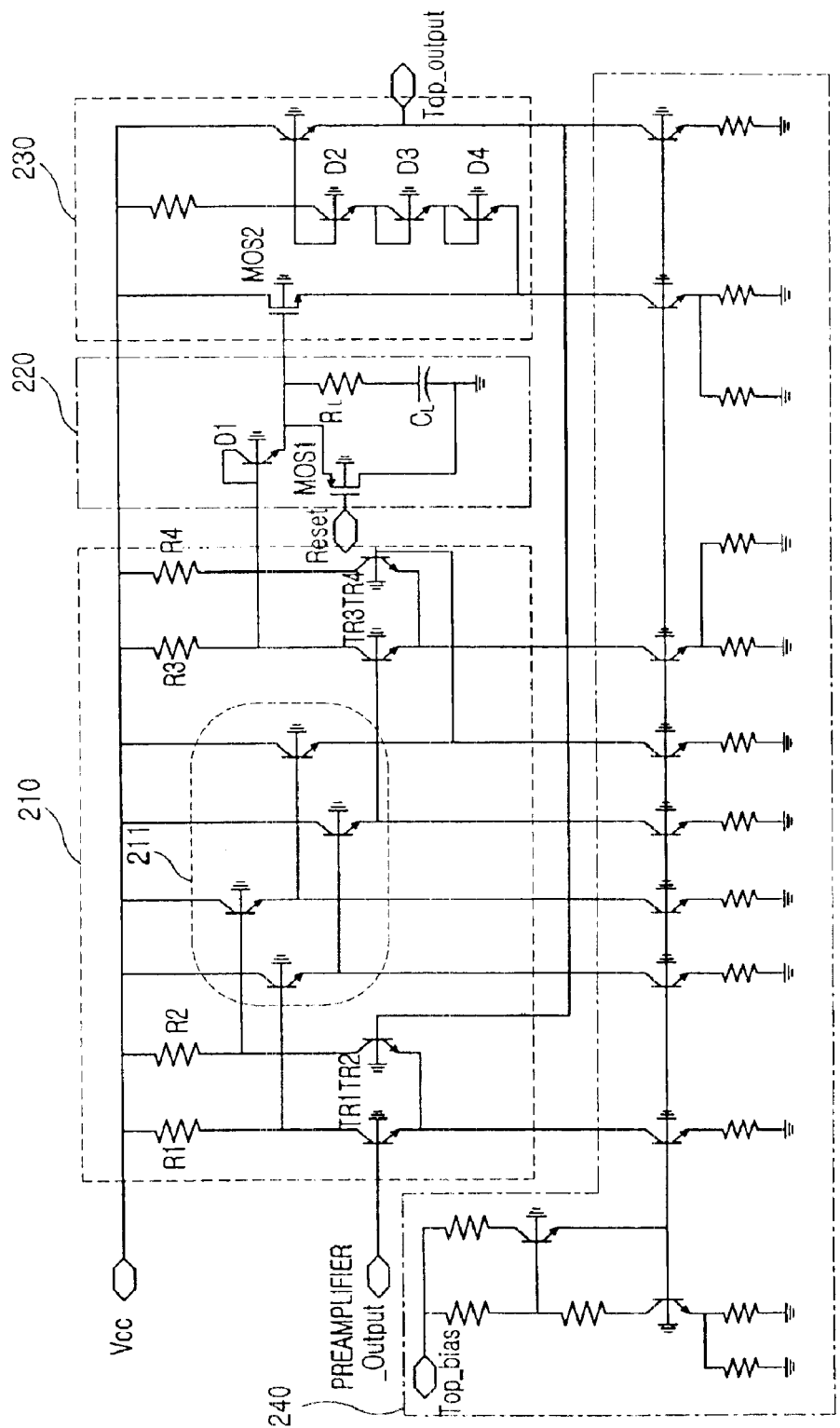
FIG. 7 is a circuit diagram of a peak detector in an automatic threshold controller in accordance with an embodiment of the present invention.

FIG. 7 is a detailed circuit diagram of the peak detector 200 in the ATC 102 in accordance with aspects of the present invention.

With reference to FIG. 7, the peak detector 200 includes an amplification circuit 210 that amplifies an input signal, a detector 220 that detects a peak level of the amplified signal, an output buffer 230, and a current source 240.

The amplification circuit 210 includes a two-stage amplifier including first and second differential amplifiers, and a two-stage buffer 221 connected between the first differential amplifier and the second differential amplifier of the two-stage amplifier. The first differential amplifier is provided with resistors R1 and R2 and transistors TR1 and TR2, and the second differential amplifier is provided with resistors R3 and R4 and transistors TR3 and TR4. The two-stage amplifier is configured to reduce a voltage offset so as to accurately detect the signal peak level. The two-stage buffer is also configured to meet an input voltage condition of the second differential amplifier (these contents were previously described in detail with reference to FIGS. 4 and 5).

The detector 220 includes a diode D1 for receiving an output signal from the amplification circuit 210, a capacitor $C_L$ and resistor $R_L$ connected in series, and a MOS transistor MOS1 for receiving the reset signal at its gate.

The reset signal applied to the MOS transistor is independently generated by the preamplifier as a result of the determination as to whether an input signal is present. The reset signal is used is because only a small amount of current flows to the gate of the MOS transistor, no discharging path exists in the MOS transistor, which makes it possible to charge the transistor, but impossible to discharge the transistor. For this reason, the reset signal is applied to the gate of the MOS transistor to discharge the transistor by force. The resistor $R_L$, connected in series with the capacitor $C_L$, acts to prevent an overshoot and error of an input signal.

The detector 220 is operated in the following manner. If the signal voltage level is raised positively, then the diode D1 is forward biased to charge the capacitor $C_L$. Alternatively, if the signal voltage level is lowered negatively, then the diode D1 is reversely biased to enter a cut-off state, which causes the capacitor $C_L$ to discharge. On this principle, the signal peak level is maintained. If the capacitor is increased in capacitance, the offset c an be reduced, but there is a disadvantage in that a larger amount of time is required in detecting the peak level. In the case where the capacitor is reduced in capacitance, the peak level detection time is advantageously shortened, whereas the offset is increased. For this reason, it is necessary to appropriately adjust an RC time constant.

The buffer 230 is connected to the output of the detector 220 in order to feed a signal detected by the detector 220 back to the amplification circuit 210. The buffer 230 is provided with a MOS transistor MOS2 that prevents the reference voltage from varying during consecutive data input and blocks an unnecessary discharging path, and a plurality of level shifting diodes D2, D3 and D4 for adjusting the level of an output voltage. The level shifting diodes D2, D3 and D4 act to prevent the signal detected by the detector 220 from being not fed back due to a large difference between the actual signal peak level and a voltage level at an output terminal of the buffer.

Figure 8:
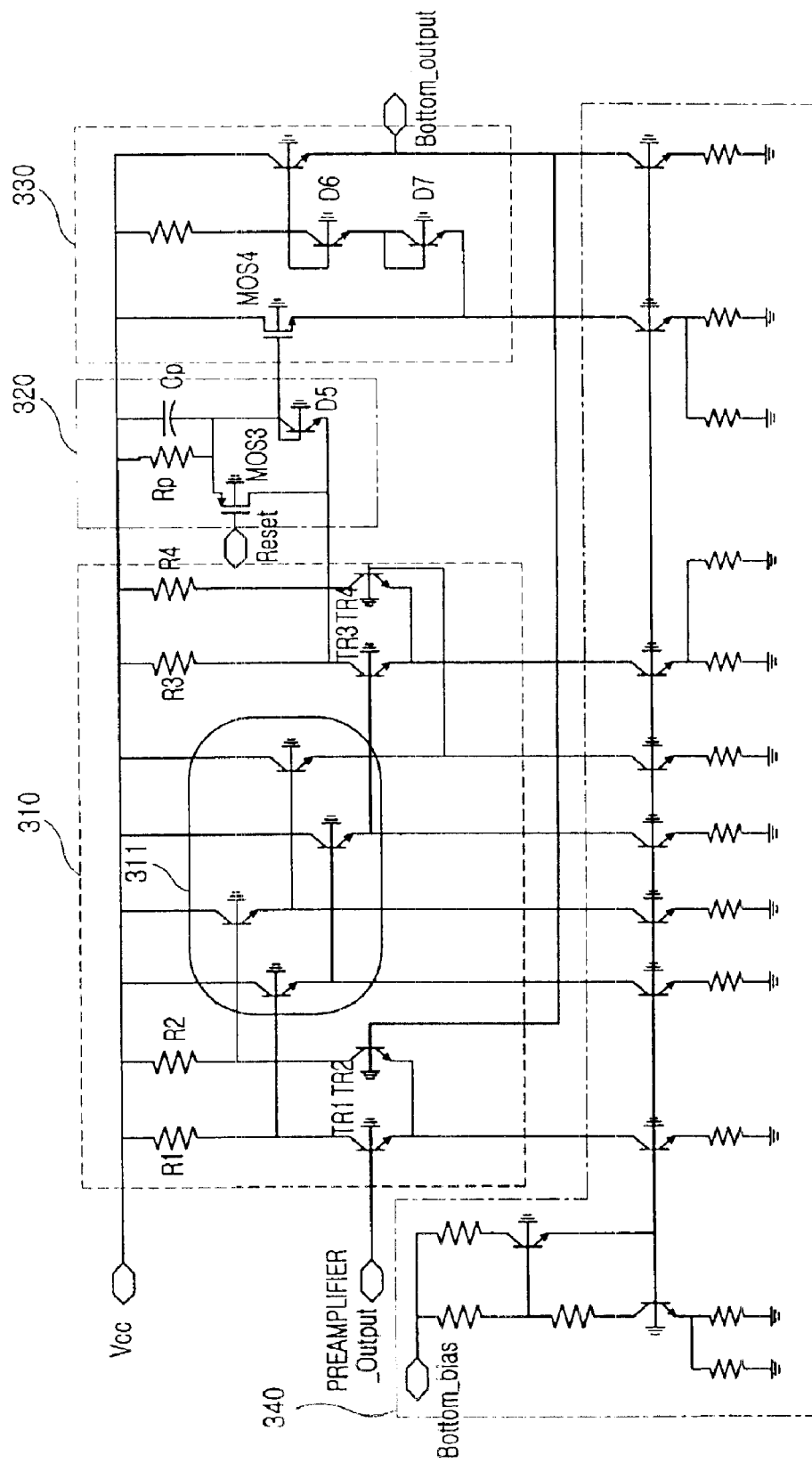
FIG. 8 is a circuit diagram of a bottom level detector in the automatic threshold controller in accordance with an embodiment of the present invention.

FIG. 8 is a detailed circuit diagram of the bottom level detector 200 in the ATC 102 The bottom level detector 200 includes an amplification circuit 310 that amplifies an input signal, a detector 320 that detects a bottom level of the amplified signal, an output buffer 330, and a current source 340.

The bottom level detector 300 is similar in construction and operation to the previously-described peak detector 200, with the exception that the detector 320 is different from the detector 220.

The detector 320 includes a diode D5 for receiving an output signal from the amplification circuit 310, a capacitor $C_P$ and resistor $R_P$ connected in parallel, and a MOS transistor MOS3 for receiving the reset signal at its gate. The detector 320 is different from the detector 220 in that the diode D5 has the opposite polarity to that of the diode D1 in the detector 220 and the charging/discharging capacitor $C_P$ is connected to Vcc, not a ground terminal. The resistor $R_P$, connected in parallel with the charging/discharging capacitor $C_P$, performs a damping operation for setting an initial drain voltage of the MOS transistor MOS3 to "5V", not "0V".

The detector 320 is operated in the following manner. If the signal voltage level is lowered negatively, then the diode D5 is forward biased to charge the capacitor $C_P$. Alternatively, if the signal voltage level is raised positively, then the diode D5 is reversely biased to discharge the capacitor $C_P$. On this principle, the signal bottom level is maintained. However, similarly to the detector 220, the detector 320 must be compulsorily discharged in response to the reset signal because it is not naturally discharged due to the structure of the output buffer downstream therefrom.

The buffer 330 is connected to the output of the detector 320 in order to feed a signal detected by the detector 320 back to the amplification circuit 310. The buffer 330 is provided with a MOS transistor MOS4 for preventing the reference voltage from varying during consecutive data input and blocking an unnecessary discharging path, and a pair of level shifting diodes D6 and D7 for adjusting the level of an output voltage. The level shifting diodes D6 and D7 act to prevent the signal detected by the detector 320 from being not fed back due to a large difference between the actual signal bottom level and a voltage level at an output terminal of the buffer.

Figure 13:
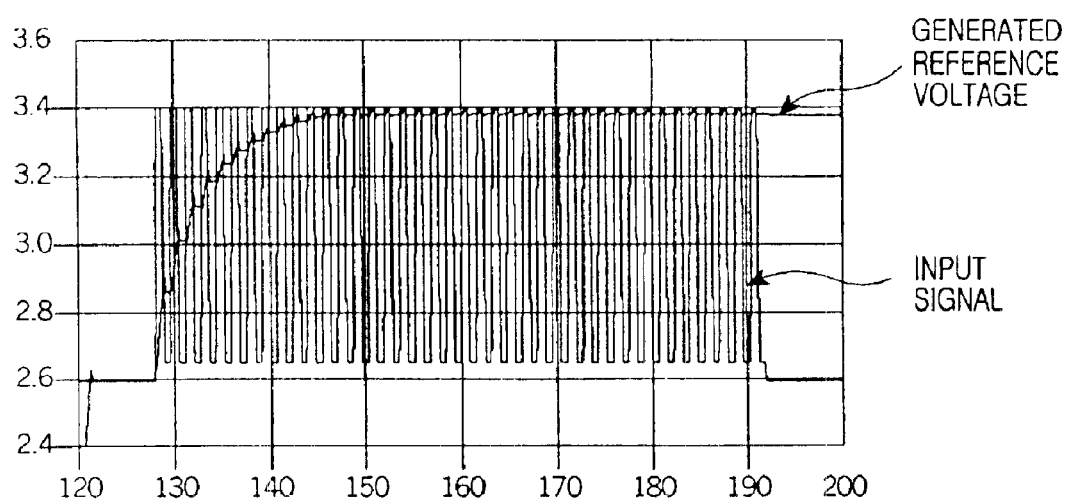
FIG. 13 is a waveform diagram illustrating an input signal-to-output signal characteristic of the peak detector in the automatic threshold controller in accordance with aspects of the present invention.
Figure 14:
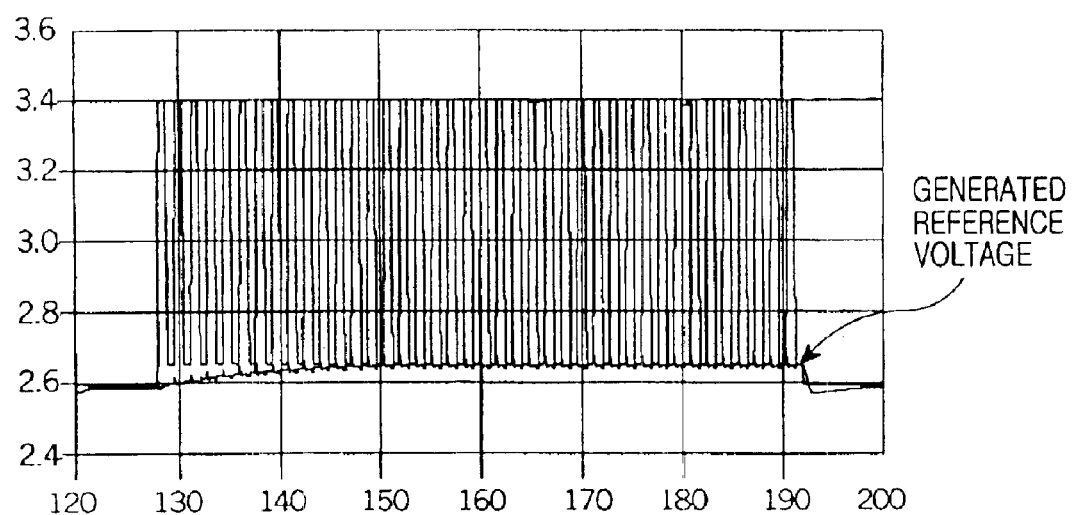
FIG. 14 is a waveform diagram illustrating an input signal-to-output signal characteristic of the bottom level detector in the automatic threshold controller in accordance with aspects of the present invention.

FIG. 13 is a waveform diagram illustrating an input signal-to-output signal characteristic of the peak detector in the ATC 102 and FIG. 14 is a waveform diagram illustrating an input signal-to-output signal characteristic of the bottom level detector in the ATC 102. As one of ordinary skill in the art will appreciate, it can be seen from these diagrams that a peak level and bottom level of an input signal are accurately detected.

Figure 15:
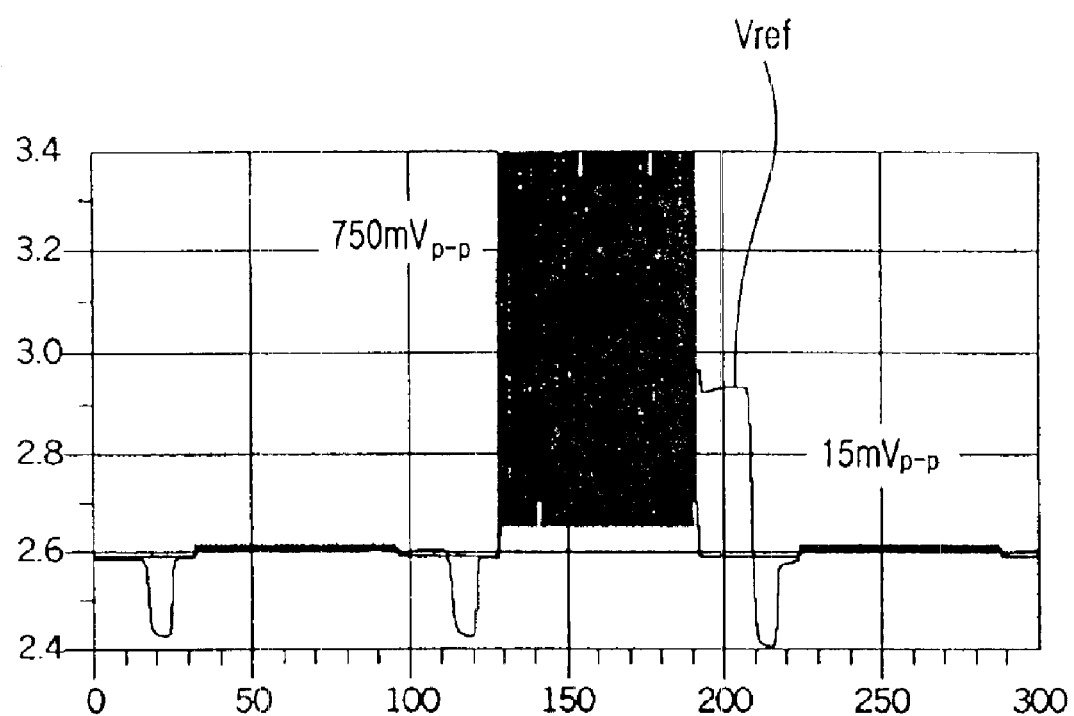
FIG. 15 is a waveform diagram illustrating a final output characteristic of the automatic threshold controller for the burst mode optical receiver in accordance with aspects of the present invention.

FIG. 15 is a waveform diagram illustrating an output characteristic of the ATC 102. In particular, a final output characteristic of the ATC 102 based on the reset signal generated by the preamplifier is shown. Here, Vref is a reference voltage generated on the basis of a bottom level voltage 15 mVpp and a peak level voltage 750 mVpp.

As apparent from the above description, the present invention provides an automatic threshold control device for a burst mode optical receiver that is capable of independently generating a reset signal for initialization in an inter-packet period. The application of the present automatic threshold control device to the burst mode optical receiver can remove a need for an additional circuit for generation of the reset signal, resulting in a reduction in the size of the receiver parts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic threshold control device for a burst mode optical receiver, the burst mode optical receiver including a converter for converting a burst mode signal into a voltage signal and an automatic gain controller for automatically controlling a gain of the converter, independently generating a reset signal and applying it to said automatic threshold control device, said automatic threshold control device detecting a voltage level of an output signal from the converter, said automatic threshold control device comprising:

a peak detector that detects a peak level of the output signal from the converter in response to the reset signal;

a bottom level detector that detects a bottom level of the output signal from the converter in response to the reset signal;

a pair of resistors each having two terminals, one terminal of each resistors being connected respectively to said peak detector and bottom level detector and the other terminals of each resistor being connected to each other, wherein a reference voltage can be generated at a point where the other terminals of each resistor are connected to each other on the basis of voltages of said peak level and bottom level; and a capacitor for storing said reference voltage.

2. The automatic threshold control device as set forth in claim 1, wherein said peak detector includes:

differential amplification means for receiving the output signal from the converter at a first input terminal and a fed-back output signal from said peak detector at a second input terminal, respectively, and amplifying a difference between the received signals;

detection means for detecting a peak level of an output signal from said differential amplification means; and output buffering means, wherein said detection means includes:

a transistor having its base and collector connected in common to an output terminal of said differential amplification means and an emitter connected to a capacitor, said capacitor being connected to a ground terminal; and a MOS transistor having a gate for receiving the reset signal, a drain connected to said emitter of said transistor and a source connected between said capacitor and said ground terminal.

3. The automatic threshold control device as set forth in claim 2, wherein said peak detector further includes a first resistor connected in series between said emitter of said first transistor and said first capacitor for preventing an overshoot of an input signal.

4. The automatic threshold control device as set forth in claim 2, wherein said output buffering means includes a MOS transistor and at least one level shifting diode connected thereto.

5. The automatic threshold control device as set forth in claim 3, wherein said output buffering means includes a MOS transistor and at least one level shifting diode connected thereto.

6. The automatic threshold control device as set forth in claim 1, wherein said bottom level detector includes:

differential amplification means for receiving the output signal from the converter at a first input terminal and a fed-back output signal from said bottom level detector at a second input terminal, respectively, and amplifying a difference between the received signals;

detection means for detecting a bottom level of an output signal from said differential amplification means; and output buffering means, wherein said detection means includes:

a transistor having an emitter connected to an output terminal of said differential amplification means and a base and a collector connected in common to a capacitor, said capacitor being connected to a power supply voltage terminal; and a MOS transistor having a gate for receiving the reset signal, a drain connected to a junction node of said base and collector of said transistor and a source connected between said output terminal of said differential amplification means and said emitter of said transistor.

7. The automatic threshold control device as set forth in claim 6, wherein said bottom level detector further includes a second resistor connected in parallel with said second capacitor for adjusting an initial drain voltage of said second MOS transistor.

8. The automatic threshold control device as set forth in claim 6, wherein said output buffering means includes a MOS transistor and at least one level shifting diode connected thereto.

9. The automatic threshold control device as set forth in claim 7, wherein said output buffering means includes a MOS transistor and at least one level shifting diode connected thereto.

* * * * *